United States Patent [19]
Seifert, Jr.

[11] 3,815,685
[45] June 11, 1974

[54] TORSION BAR CLAMP

[76] Inventor: Edwin A. Seifert, Jr., Rt. 1, Belgrade, Mont. 59714

[22] Filed: Nov. 27, 1972

[21] Appl. No.: 309,938

[52] U.S. Cl.................. 172/711, 172/705, 267/154
[51] Int. Cl........................... A01b 35/24, F16f 1/14
[58] Field of Search .......... 172/261, 264, 265, 705, 172/711; 56/392; 267/57, 154

[56] References Cited
UNITED STATES PATENTS

| | | | |
|---|---|---|---|
| 2,798,419 | 7/1957 | Moriceau | 267/57 X |
| 3,139,145 | 6/1964 | Hofer | 172/711 |
| 3,706,345 | 12/1972 | Patterson et al. | 172/711 X |

FOREIGN PATENTS OR APPLICATIONS

| | | | |
|---|---|---|---|
| 655,337 | 1/1963 | Canada | 172/711 |
| 695,711 | 8/1953 | Great Britain | 172/705 |

*Primary Examiner*—Robert E. Pulfrey
*Assistant Examiner*—Paul T. Sewell
*Attorney, Agent, or Firm*—Clarence A. O'Brien; Harvey B. Jacobson

[57] ABSTRACT

A mounting structure for support from an implement frame and including first and second brackets supported on the frame in transversely spaced relation and the first bracket includes an anchor portion oscillatably supported therefrom for rotation about an axis extending between the brackets. The anchor portion includes structure for anchoring one end of an implement therefrom and an elongated torsion bar extends between the brackets and has one end thereof supported from the second bracket for adjustable angular positioning about the longitudinal axis of the torsion bar, the second end of the torsion bar being keyed to the anchor portion for oscillation therewith.

3 Claims, 5 Drawing Figures

PATENTED JUN 11 1974  3,815,685

3,815,685

TORSION BAR CLAMP

The torsion bar clamp of the instant invention has been specifically designed to provide a mounting structure for the support arm of a cultivating shovel, or the like, whereby the support will yieldingly resist but be capable of being swung rearwardly and upwardly at its lower end so as to clear a ground obstruction.

The torsion bar clamp is constructed in a manner whereby the torsion yieldingly resisting rearward and upward retraction of the associated arm may be readily adjusted and the clamp has further been constructed in a manner so as to eliminate unwanted upward protrusions projecting above the associated implement frame.

A main object of this invention is to provide a torsion bar clamp for supporting implement support arms whereby the lower end of the support arm and the ground engaging element supported therefrom may be swung rearwardly and upwardly to clear ground obstructions.

Another object of this invention, in accordance with the immediately preceding object, is to provide a torsion bar clamp which will enable the torque yieldingly resisting rearward and upward swinging movement of the lower end of the associated implement arm to be adjusted as desired.

A still further object of this invention is to provide a mounting structure, in accordance with the preceding objects, which will substantially eliminate unwanted upward projections which extend above the associated implement frame.

A final object of this invention to be specifically enumerated herein is to provide a torsion bar clamp which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
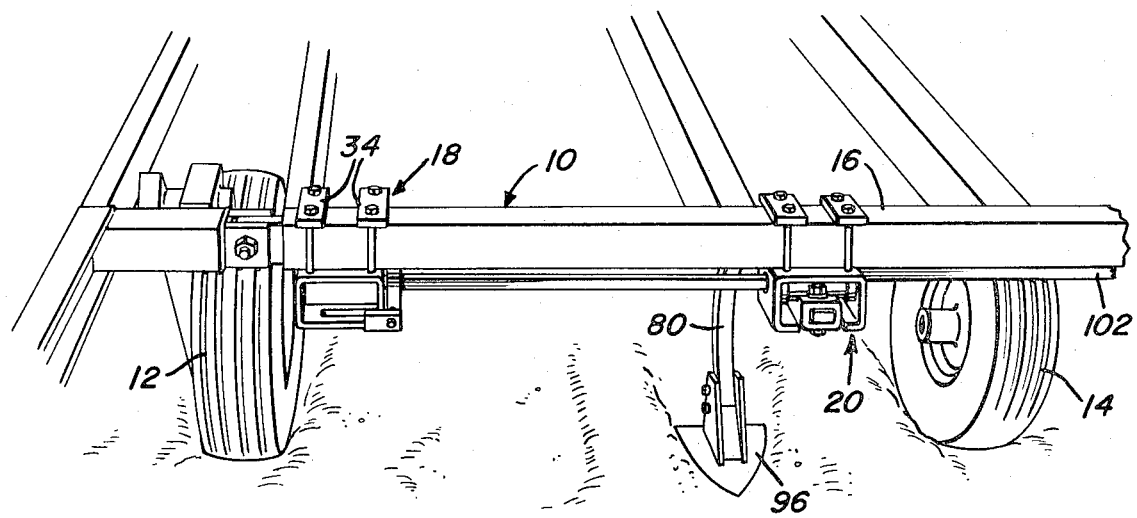
FIG. 1 is a fragmentary, perspective view of a conventional form of wheeled implement frame upon which at least two torsion bar clamps constructed in accordance with the present invention are mounted and with a torsion bar extending between the clamps and operatively associated with a depending implement arm oscillatably supported from one of the clamps.

Referring now more specifically to the drawings, the numeral 10 generally designates a conventional form of implement frame including ground engaging support wheel assemblies 12 and 14. The frame 10 further includes a transverse beam 16 and a pair of torsion bar clamp assemblies constructed in accordance with the present invention and generally referred to by the reference numerals 18 and 20 are supported from the transverse beam 16 at points spaced therealong.

Figure 2:
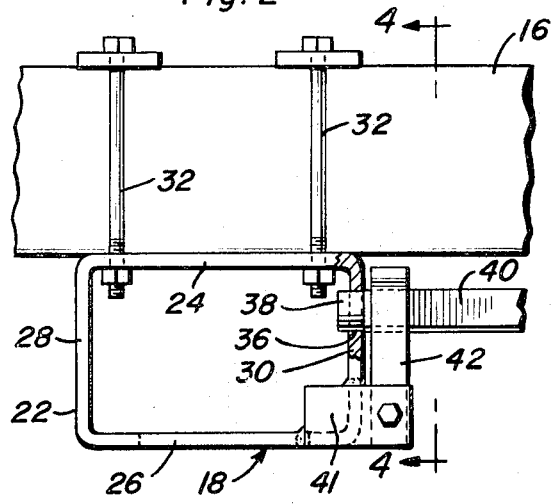
FIG. 2 is a fragmentary, enlarged, elevational view of the left clamp illustrated in FIG. 1 with portions thereof being broken away and demonstrated in vertical section.
Figure 4:
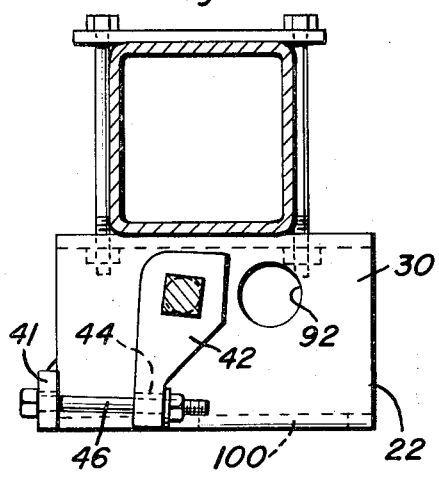
FIG. 4 is a vertical, sectional view taken substantially upon a plane indicated by the section line 4—4 of FIG. 2.

With reference now more specifically to FIGS. 2 and 4 of the drawings, it may be seen that the clamp assembly 18 comprises a front to rear extending tubular member 22 including upper and lower walls 24 and 26 and upstanding opposite side walls 28 and 30. The tubular member 22 is open at its opposite ends and two pairs of fastening bolts 32 are disclosed on opposite sides of the beam 16 and secured through the upper or top wall 24 and also the opposite ends of a pair of front to rear extending mounting straps 34 extending across the upper portion of the beam 16. In this manner, the tubular member 22 is rigidly secured to the beam 16. Also, the side wall 30 is provided with a horizontal bore 36 in which the reduced cylindrical terminal end 38 of a torsion bar 40 extending along the beam 16 between the clamp assembly 18 and clamp assembly 20 is rotatably received. An anchor plate 41 is secured to and projects horizontally outwardly from the forward lower left hand corner of the tubular member 22 and a crank arm 42 is secured on the end portion of the torsion bar 40 disposed immediately outwardly of the bore 36. The free end of the crank arm or lever arm 42 has a front to rear extending bore 44 formed therethrough and an adjustable tension member in the form of a threaded bolt 46 is secured through the anchor plate 41 and the bore 44, whereby the lower end of the crank arm 42 may be drawn forwardly toward the anchor plate 41.

The clamp assembly 20 comprises a front to rear extending tubular member 52 including upper and lower walls 54 and 56 and opposite side walls 58 and 60. The tubular member 52 is secured to the beam 16 by means of a second pair of fastener bolts 62 whose upper ends are secured through the opposite ends of mounting straps 64 corresponding to the straps 34 and the side walls 60 include an opening 66 corresponding to the opening or bore 36. Further, the inner surfaces of the side walls 58 and 60 include inwardly projecting aligned journaled blocks 68 and 70, the journal block 70 being aligned with the bore 66 and the opposite ends of a transverse head 72 carried by a front to rear extending sleeve-type anchor portion 74 are journaled in journal blocks 68 and 70.

The transverse head 72 includes a lengthwise extending blind socket 76 opening outwardly of the end of the head 72 adjacent the clamp assembly 18 and the end of the torsion bar 40 remote from the clamp assembly 18 is seated and keyed in the socket 76.

The transverse head 72 is welded to the anchor portion defining sleeve 74, although the head 72 and anchor portion 74 may be cast integrally, and the anchor portion 74 defines a front to rear extending passage 78 in which the upper forwardly directed end of a rearwardly and downwardly curving support arm 80 is secured by means of a fastener 82 secured through the upper terminal end of the support arm 80 and the adjacent portions of the upper and lower walls 84 and 86 of the anchor portion 74.

Figure 5:
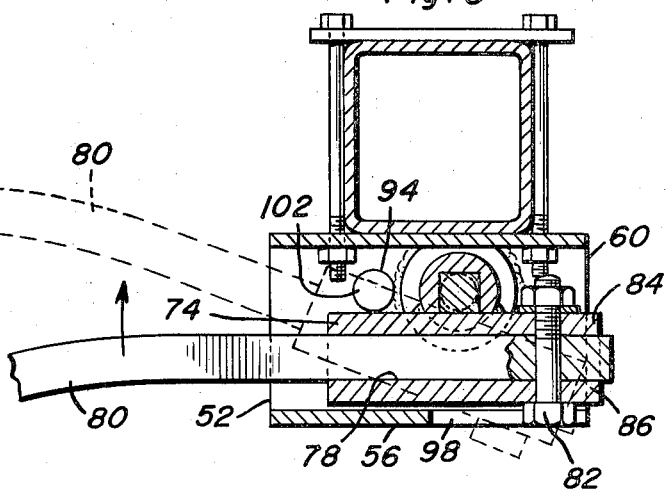
FIG. 5 is a fragmentary, vertical sectional view taken substantially upon a plane indicated by the section line 5—5 of FIG. 3.

It will be noted from a comparison of FIGS. 4 and 5 that the bore 36 is aligned with the journals 68 and the opening 90 formed through the side wall 58 of the tubular member 52 through which the torsion bar 40 extends. It will also be noted that the side wall 30 of the tubular member 22 includes a second opening 92 which is aligned with a second opening 94 formed in the side wall 60 of the tubular member 52.

The lower end of the support arm 80 has a cultivating shoe 96 supported therefrom. The tension member 46 is adjusted so as to exert torsion on the cross head 72 maintaining the shovel 96 in contact with the ground. However, should the shovel 96 encounter an obstruction, the support arm 80 may swing upwardly and rearwardly from the solid line position thereof illustrated in FIG. 5 to the dotted line position illustrated in FIG. 5 in order that the shovel 96 may clear the obstruction. The bottom wall of lower wall 56 is provided with an opening 98 to provide clearance for the tubular anchor portion 74 when the support arm 80 is in the phantom line position thereof illustrated in FIG. 5 and in the event the tubular member 22 is also provided with an anchor portion corresponding to the anchor portion 74 oscillatably supported from the tubular member 22 in concentric relation relative to the opening 92, the bottom wall or lower wall 26 of the tubular member 22 is provided with an opening 100 to provide clearance for such an additional anchor portion. It will be noted that the anchor portion to be supported from the tubular member 22 will be offset forwardly relative to the anchor portion 74 supported from the tubular member 52. Also, the transverse beam 16 is provided with a third clamp assembly (not shown) disposed outward relative to the clamp assembly 20 and with which a second torsion bar 102 is operatively associated, the reduced terminal end of the torsion bar 102 being journaled in the bore 94.

Figure 3:
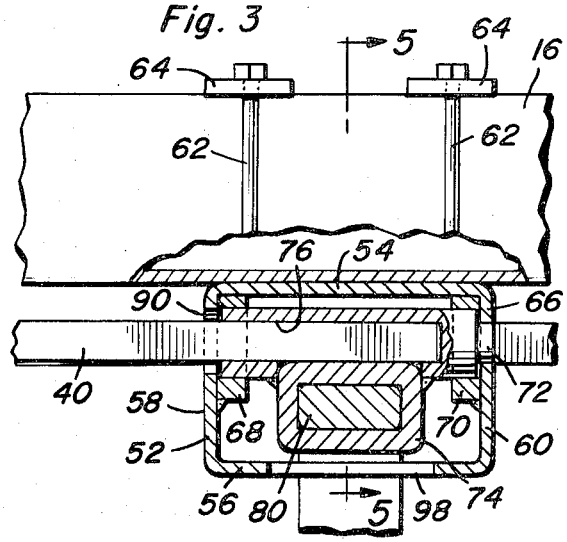
FIG. 3 is an enlarged, fragmentary, vertical sectional view of the right hand mounting clamp illustrated in FIG. 1 and taken substantially upon a plane passing through the center of the associated torsion bar.

From FIGS. 1, 2 and 3, it will be noted that the disclosed mounting of the clamp assemblies 18 and 20 affords substantially unobstructed areas above, to the front of and to the rear of the transverse beam 16 whereby equipment for seeding or other attachments may be readily mounted on the beam or bar 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A mounting structure for an implement arm, said structure including first and second stationarily supported horizontally spaced apart first and second generally parallel and horizontal tubular brackets each including opposite side walls, one of said brackets including a sleeve portion extending and journaled between the side walls thereof for oscillation relative thereto, generally aligned openings formed in the adjacent side walls of said brackets with the opening formed in the side wall of said one bracket aligned with the adjacent end of said sleeve, a torsion bar extending between said brackets and having its opposite ends rotatably received through said openings, the end of said torsion bar adjacent said sleeve being removably telescopingly keyed thereto for oscillation therewith, crank arm means carried by and projecting outwardly from the end of said torsion bar adjacent the other bracket outwardly of the corresponding side wall, adjustable means operatively connected between an outer end portion of said crank arm means and said bracket for angularly adjusting said crank arm means relative to said other bracket, said one bracket having at least one open end, said sleeve portion including an elongated tubular anchor portion extending transverse to said sleeve portion and longitudinally of said one bracket, and an implement support arm including a base end portion telescoped into and secured within the end of said tubular anchor portion adjacent the open end of said one bracket with the support arm projecting through said open end, the far side wall of said one bracket remote from said other bracket including an opening formed therein corresponding to the opening formed in said other bracket side wall opening and spaced along said far side wall from the first-mentioned opening formed therein and adapted to rotatably receive one end portion of a second torsion bar.

2. The combination of claim 1 wherein said adjacent end of said sleeve includes a non-circular recess formed therein opening outwardly thereof, said torsion bar including a non-circular end portion axially telescoped and keyed in said recess.

3. The combination of claim 1 including aligned journal blocks supported from the inner surface portions of the side walls of said one bracket and in which the opposite ends of said sleeve are rotatably received.

* * * * *